US008070105B2

(12) United States Patent
Johnson et al.

(10) Patent No.: US 8,070,105 B2
(45) Date of Patent: Dec. 6, 2011

(54) INFLATABLE NESTED TOROID STRUCTURE

(75) Inventors: Christopher J. Johnson, Houston, TX (US); Jasen L. Raboin, League City, TX (US); Gary R. Spexarth, Houston, TX (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 1025 days.

(21) Appl. No.: 11/956,826

(22) Filed: Dec. 14, 2007

(65) Prior Publication Data
US 2011/0180669 A1   Jul. 28, 2011

(51) Int. Cl.
*B64G 1/00* (2006.01)
(52) U.S. Cl. ...................................... 244/158.3; 52/2.11
(58) Field of Classification Search ................. 244/158.3
See application file for complete search history.

(56) References Cited

U.S. PATENT DOCUMENTS

| | | | | |
|---|---|---|---|---|
| 3,144,219 | A | * | 8/1964 | Schnitzer .................... 244/158.3 |
| 4,021,873 | A | * | 5/1977 | Francois ........................ 114/345 |
| 4,166,597 | A | | 9/1979 | Seifert et al. |
| 4,730,797 | A | | 3/1988 | Minovitch |
| 4,770,374 | A | | 9/1988 | Regipa |
| 5,044,579 | A | | 9/1991 | Bernasconi et al. |
| 5,305,970 | A | | 4/1994 | Porter et al. |
| 5,641,135 | A | | 6/1997 | Stuart et al. |
| 6,293,500 | B1 | | 9/2001 | Bigelow |
| 6,439,508 | B1 | | 8/2002 | Taylor |
| 6,536,712 | B1 | | 3/2003 | Barenett |
| 6,547,189 | B1 | * | 4/2003 | Raboin et al. .............. 244/158.3 |
| 6,568,640 | B1 | | 5/2003 | Barnett |
| 6,786,456 | B2 | | 9/2004 | Veal et al. |
| 6,938,858 | B1 | | 9/2005 | Schneider et al. |
| 6,962,310 | B1 | | 11/2005 | Bigelow |
| 6,974,109 | B1 | | 12/2005 | Mezits et al. |
| 7,377,783 | B2 | * | 5/2008 | Bigelow ......................... 434/34 |
| 2005/0126081 | A1 | | 6/2005 | Patel et al. |

* cited by examiner

*Primary Examiner* — Joshua Michener
*Assistant Examiner* — Medhat Badawi
(74) *Attorney, Agent, or Firm* — Kurt G. Hammerle

(57) ABSTRACT

An inflatable structure comprises at least two generally toroidal, inflatable modules. When in a deployed mode, the first, inner module has a major diameter less than that of a second, outer module and is positioned within the inner circumference of the outer module such that the first module is nested circumferentially alongside the second module. The inflatable structure, in a non-deployed, non-inflated mode, is of compact configuration and adapted to be transported to a site of deployment. When deployed, the inflatable structure is of substantially increased interior volume. In one embodiment, access between the interior of the first module and the second module is provided by at least one port or structural passthrough. In another embodiment, the inflatable structure includes at least one additional generally toroidal module external of and circumferentially surrounding the second module.

13 Claims, 11 Drawing Sheets

INFLATABLE NESTED TOROID STRUCTURE

ORIGIN OF THE INVENTION

The invention described herein was made by employees of the United States Government and may be manufactured and used by or for the Government of the United States of America for governmental purposes without the payment of any royalties thereon or therefor.

FIELD OF THE INVENTION

This invention relates generally to inflatable structures. More particularly, it relates to an inflatable structure comprising at least two substantially toroidal modules nested within one another.

BACKGROUND OF THE INVENTION

Inflatable structures may be used as human habitats, storage facilities, laboratories, or for other sheltering applications. When such a structure is used in a remote or environmentally adverse region, such as sub-zero regions, emergency shelters after harsh weather storms, or outer space environments, its deployment can be accomplished efficiently and quickly, minimizing exposure of workers to the extremes of weather or other environmental hazards. Additionally, such structures can be transported to a desired site while in a compact, deflated mode and later deployed by inflation at the site to form larger, self-supporting structure, thereby reducing the amount of space required during transport. Their use also enables the construction of self-supporting structures of greater size and interior volume but of lighter weight than structures made of conventional, rigid materials, thereby reducing weight during transport.

The basic construction of an inflatable, cylindrical structure or module and its deployment in exoatmospheric space is disclosed in detail in U.S. Pat. No. 6,231,010 (the '010 patent) and U.S. Pat. No. 6,547,189 (the '189 patent), both of which are hereby incorporated by reference. As disclosed in these two patents, the flexible outer walls of such inflatable space modules are complex structures incorporating multiple layers of flexible materials selected to perform their respective functions. The wall structure of such a module, when the module is in its non-deployed mode, is folded upon itself to form a compact unit. As the module is inflated, gas under pressure introduced into the interior of the module increases the internal pressure causing the wall structure to expand outwardly. In the process, the inflation and outward expansion of the module exerts stresses upon the outer wall structure of the inflatable module. The loads resulting from inflation of the module are largely born by a restraint layer, which is designed to sustain the resultant loads. The restraint layer typically comprises a webbing formed of multiple, orthogonal straps of high tensile strength material such as Kevlar® or Vectran®.

Inflatable space modules have generally included a sidewall portion that, in the deployed mode, is a substantially cylindrical configuration. For example, the inflatable cylindrical structure illustrated and described in the '010 and '189 patents comprise longitudinally extending modules having substantially cylindrical wall portions that are closed at opposite ends. In some embodiments, the design for such modules has included a rigid, longitudinally extending central core structure. The webbing of load-bearing straps extend generally longitudinally about the module or circumferentially around the cylindrical wall portion to sustain the loads that result as the module is inflated, with the flexible wall structure being expanded to form a semi-rigid, self-supporting structure. When inflated and deployed, the structure expands into a longitudinally extending, generally cylindrical module, the volume of which may be sufficiently large to permit use of the module as an orbiting human habitat.

SUMMARY OF THE INVENTION

The present invention comprises an inflatable structure having at least two inflatable modules which, upon deployment, are each of substantially toroidal configuration. In one embodiment, the structure includes first and second inflatable modules. When deployed, the second module has a major diameter greater than that of the first module, and the first module is nested circumferentially within and alongside the inner circumference of the second module. Means are provided for interconnecting interior volumes of the first and second modules. In operation, the inflatable structure is transported to a desired site or region in a compact, non-deployed mode and inflated at the desired site or region to form an enlarged, self-supporting structure having at least two, toroidal modules as interior compartments. In one application, the structure is adapted for deployment in exoatmospheric space to form a human habitat, laboratory, space station, or the like which may be maintained in earth orbit. In other applications, the inflatable structure may be deployed on or near the surface of the moon, Mars, or other extra-terrestrial bodies. In some embodiments, such as for applications in which hazardous environments are a factor, means are provided for shielding the inflatable structure from radiation and particulate bombardment. Methods for the initial assembly of the inflatable structure before deployment are also described.

DETAILED DESCRIPTION OF EMBODIMENTS OF THE INVENTION

Embodiments of the invention will now be described with reference to the appended drawings, with like numerals referring to like elements or components of the embodiments. While the embodiments illustrated and described herein discuss applications of the inflatable structure for deployment in exoatmospheric space, other applications and other embodiments are also within the scope of the invention, as set forth in the accompanying claims. The construction of an inflatable cylindrical module, particularly adapted for deployment in exoatmospheric space, is disclosed in detail in U.S. Pat. Nos. 6,23,010 and 6,547,189. These two U.S. patents are herein incorporated by reference in their entirety. Accordingly, reference is made to the '010 and '189 patents for a detailed disclosure of an embodiment for the construction of an inflatable module operatively connected to a rigid core assembly.

Figure 1:
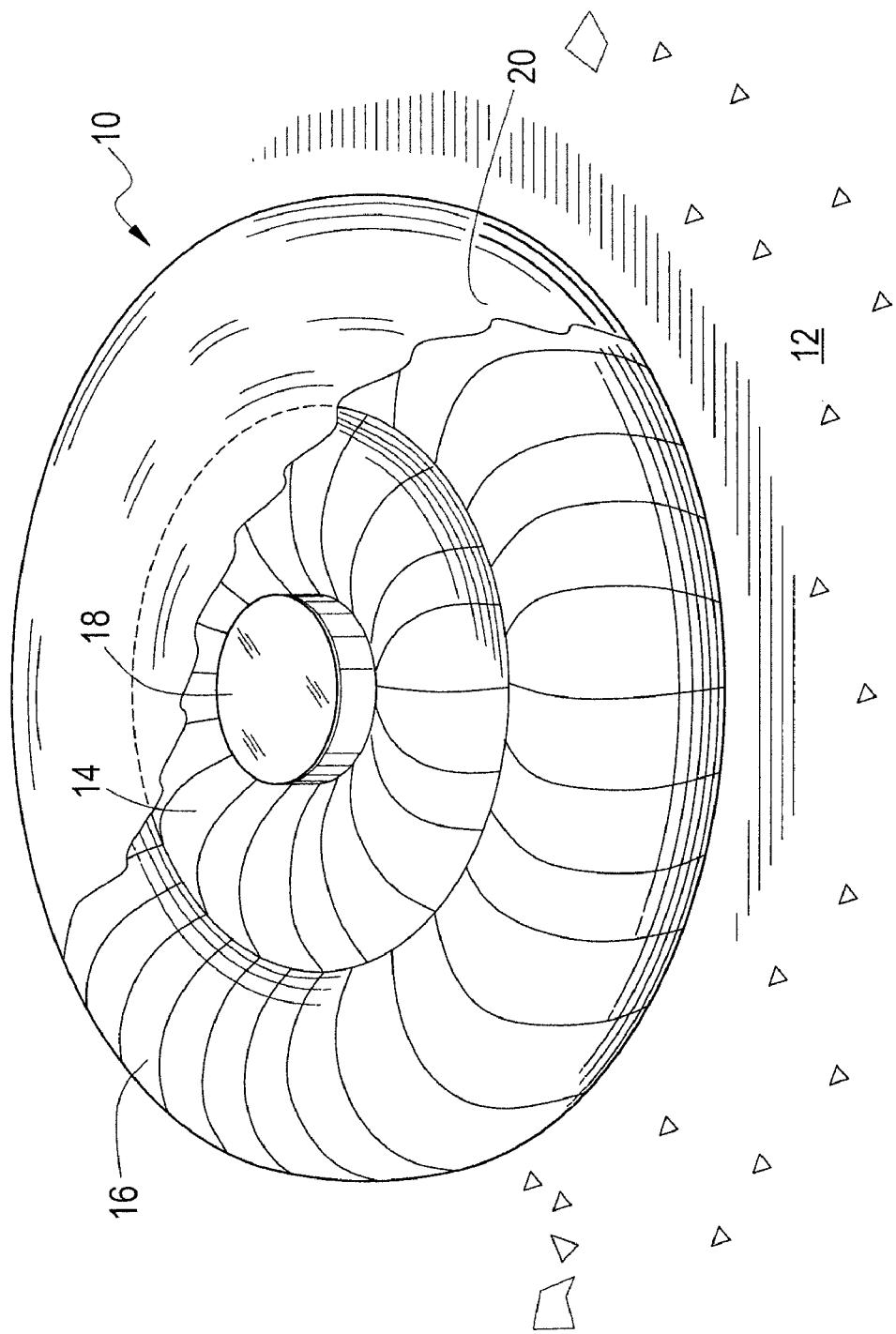
FIG. 1 is a partially diagrammatic, perspective representation of one embodiment of an inflatable nested toroid structure having first and second inflatable modules and an environmental shield, partially broken away for clarity in illustration.

Referring now to FIG. 1, an embodiment of an inflatable nested torpid structure 10 in its deployed, inflated mode is shown resting upon a generally planar supporting surface 12. For the presently illustrated embodiment, the inflatable structure 10 comprises a first inflatable module 14 and a second inflatable module 16, each being of substantially toroidal configuration when inflated and deployed. The term "module" as used herein refers to a major portion or element of the inflatable structure. The second or outer module 16 has a major diameter greater than that of the first, or inner module 14, and the first module is nested circumferentially alongside the inner circumference of the second outer module. In some embodiments, the inner module is also nested concentrically within the second outer module. Although the embodiment shown in the drawings and described in this description comprises two substantially toroidal modules 14 and 16, other embodiments of the inflatable nested toroid structure 10 may comprise additional modules of toroidal configuration, the next outer module (not shown) being positioned and extending circumferentially around the second most outer module (in the case of three modules, the second module 16) with each inner module nesting circumferentially alongside and within such neighboring outer toroidal module. In other words, for each additional module, the inner modules nest circumferentially within its neighboring outer toroidal module.

For the embodiment illustrated in FIG. 1, a substantially cylindrical core assembly 18 comprising a rigid structure is also shown nested circumferentially and coaxially within the inner module 14. While the appended drawings illustrate embodiments wherein the core assembly 18 comprises a rigid structure, the core assembly 18 may comprise an inflatable, "soft-goods" section similar to the components of the inflatable modules 14 and 16. In such an alternate embodiment, the core assembly comprises an inner-core restraint layer combined with an inner-core bladder rather than a rigid structure.

For some space applications, inflatable structure 10 may be placed in earth-orbit. In other space applications, inflatable structure 10 may be deployed on the surface of the moon or planets for use as a human habitat, storage facility, or the like. For such space-related applications, the inflatable structures are launched by suitable launch vehicles and subsequently released from the launch vehicle to be placed in an orbital or other desired trajectory or at a particular extraterrestrial location.

When the inflatable structure is exposed to a hazardous environment, whether on Earth or in space, the inflatable structure 10 further comprises means for providing environmental shielding to protect the structure and any occupants therein from such environmental hazards. As shown in FIG. 1, for example, an environmental shield 20 is provided as a protective covering or sheet that extends over the inner module 14 and outer module 16 as well as the core assembly 18. Examples of environmental hazards that the environmental shield 20 is designed to protect against include micro-meteoroids, orbital debris, atomic oxygen, and radiation.

For some applications outside the earth's atmosphere, the environmental shield is designed to protect the modules and their interiors from radiation and particulate bombardment. For example, if the inflatable structure 10 is intended to be deployed on the surface of the moon or a planet, it will be subject to dangerous forms of ionizing radiation and the like. In such hazardous environments, the environmental shield 20 may be formed of sheets of radiation-protective materials such as water or locally-derived protective materials.

For some other applications, however, conditions may not demand radiation-protective materials for the environmental shield 20. For example, if the inflatable structure is to be used as a human habitat placed in earth orbit, radiation may not be a major factor because of the protection afforded by the Van Allen belts. In such an environment, hypervelocity impacts with micro-meteoroid orbital debris (MMOD) typically are of greater concern, so the environmental shield is designed in the form of a MMOD shield (not shown) incorporated within or external to flexible outer walls 36 and 38 (FIG. 6) of the inflatable modules 14 and 16, respectively. The construction and materials used for the outer walls 36, 38, including the MMOD shield incorporated within the flexible wall structures, are shown and described in more detail in the '010 and '189 patents and will not be repeated here. The accompanying drawings have omitted several layers of the flexible outer walls 36, 38 for simplicity of illustration.

Figure 2:
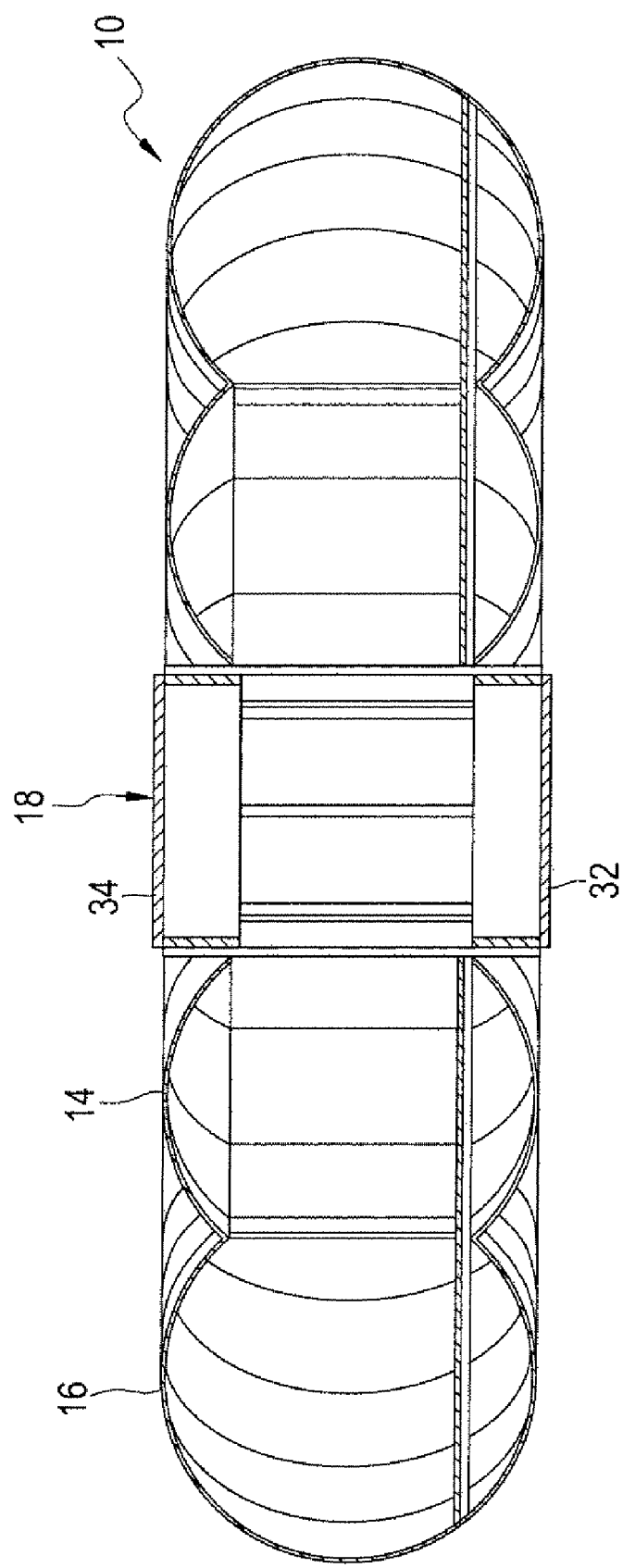
FIG. 2 is a cross-sectional view of the inflatable structure of FIG. 1.

With reference now to FIG. 2, inner core assembly 18, of generally cylindrical configuration in the present embodiment, is shown in cross-section nested concentrically within the first inflatable module 14, the first module 14 being concentrically nested within the second outer module 16. The first and second modules 14, 16 and the central core assembly 18 are arranged in a substantially co-planar configuration, with the modules 14 and 16 having substantially equal minor (i.e., cross-sectional) diameters for its respective toroidal configuration. However, the modules 14, 16 need not have equal or substantially equal minor diameters. In alternate embodiments, the inflatable modules 14, 16 are of differing minor diameters (i.e., one larger than the other) as may be desired for a particular application. When intended for use as a human habitat, the minor diameters of the modules (14 and 16) are sufficiently large enough to provide adequate headroom and convenient access within and between the modules for the occupants.

Figure 3:
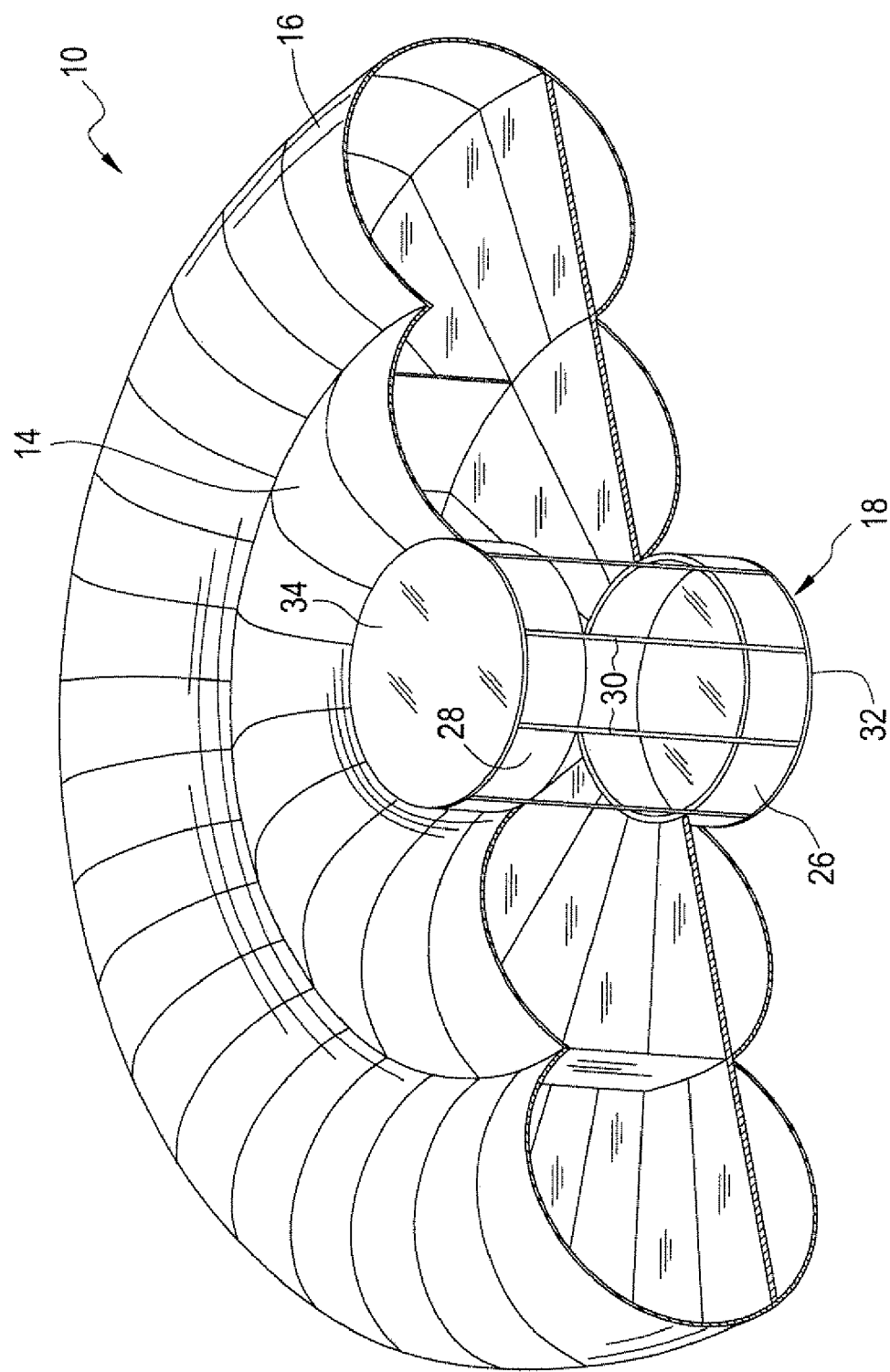
FIG. 3 is a perspective view of the cross-sectional view of FIG. 2 (with the environmental shielding being omitted for clarity) that shows portions of a cylindrical core assembly.

FIG. 3 shows the core assembly 18 in greater detail. The core assembly 18 serves such functions as structural support, storage capacity, and the like. In the illustrated embodiment, the core assembly 18 includes first and second cylindrical sleeve members 26, 28, mutually spaced and positioned in coaxial alignment. In the present embodiment, the sleeve members 26, 28 are interconnected by a plurality of elongated struts or rods 30 which are attached to and extend between the first and second cylindrical sleeve members 26, 28, the rods being mutually spaced around the circumferences of the sleeve members. In the illustrated embodiment of FIG. 1, in which the inflatable structure rests on surface 12, the rods 30 extend substantially perpendicular from surface 12. A first end cap structure 32 and a second end cap structure 34, each of circular construction in plan view, are mounted on top of the outer end portions of the sleeve members 26, 28, respectively, thereby serving to close the end portions of the sleeves and to increase the rigidity and structural strength of the core assembly 18. As will be discussed in greater detail for the description related to FIG. 8, the core assembly 18 provides support for the inflatable structure 10 when it is in its deflated, non-deployed mode (FIG. 8) and support and added volume for the inflatable structure when in its deployed mode (FIGS. 1-6). While of generally rigid construction in the present embodiment, for other embodiments that are not shown, the core structure may be formed of connecting strut members, an inflatable bladder, or a combination of both.

Figure 4:
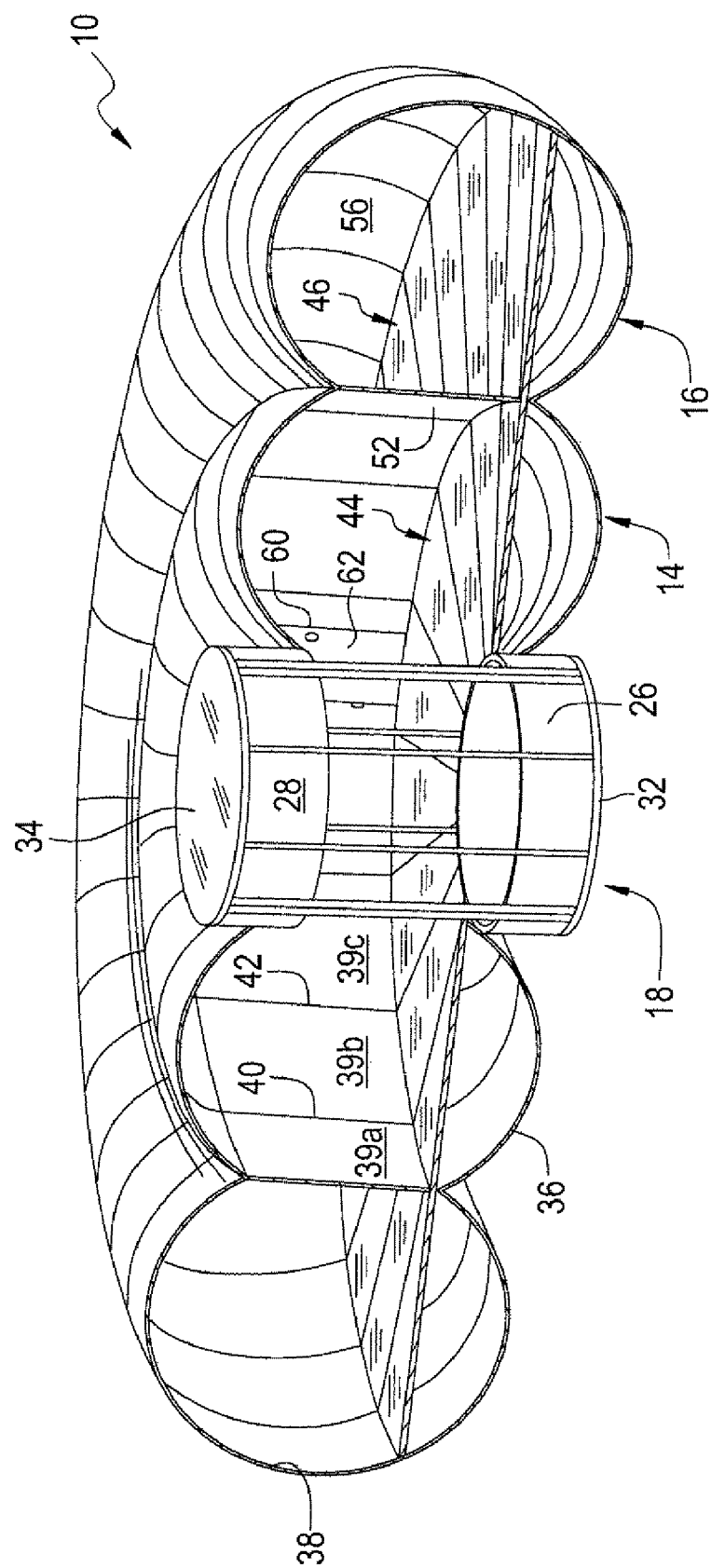
FIG. 4 is another perspective view of the cross-sectional view of FIG. 2 showing details of the interior of the first and second inflatable modules.

Referring now to FIG. 4, the first inflatable module 14 and the second inflatable module 16 are shown as comprising wall portions 36, 38 and flooring 44, 46, respectively. Each wall portion (36, 38) further comprises two major components: a bladder 86, 82 (shown independently in FIGS. 9 and 10, respectively) and a restraint layer 84, 80 (shown separately in FIGS. 11 and 12), respectively. In one embodiment, the interior walls of inner and outer modules 14 and 16 comprise multiple segments, such as segments 39a, 39b, and 39c, which are mutually interconnected at their respective circumferentially extending seams, e.g., seams 40 and 42.

Figure 5:
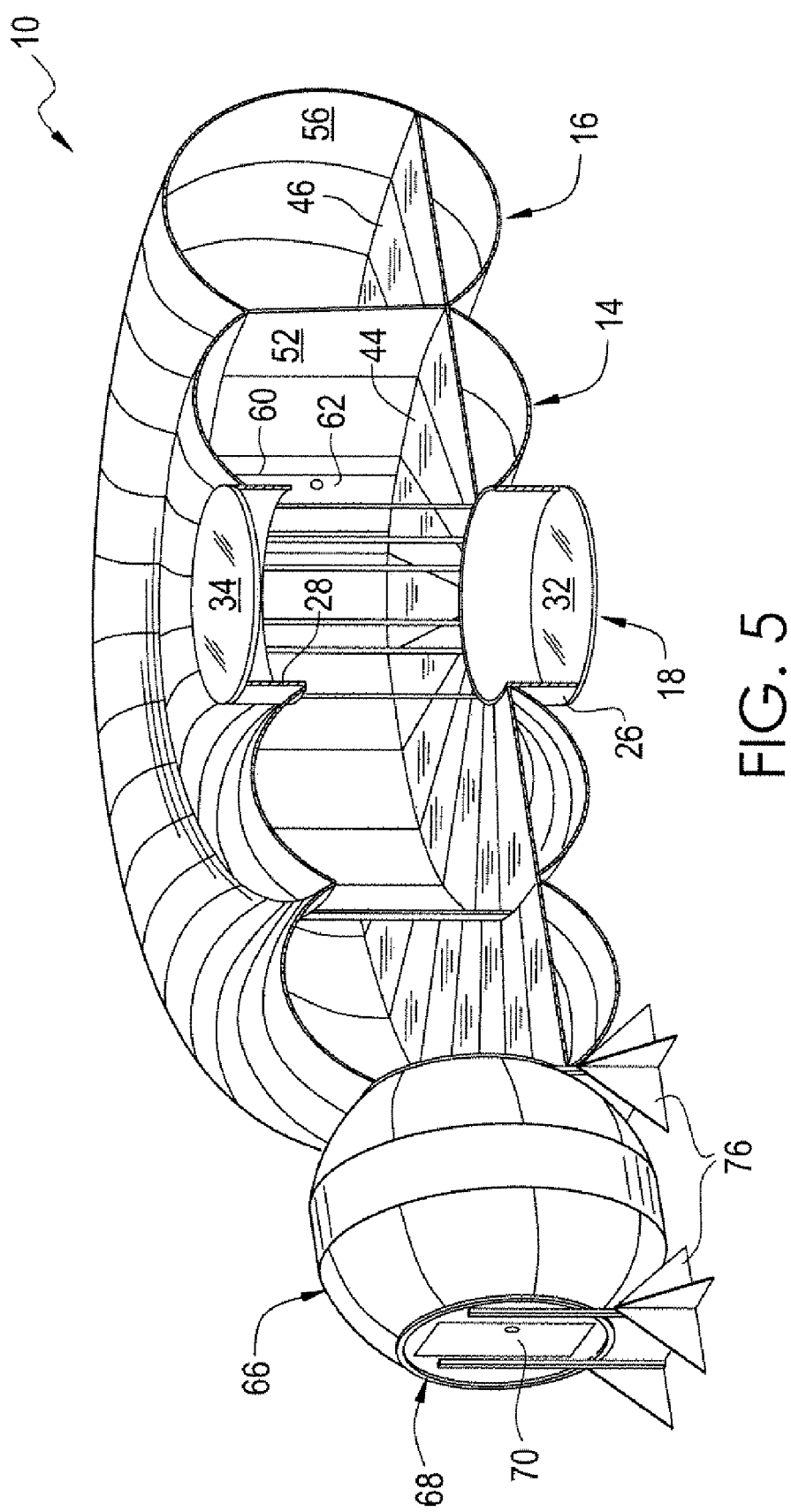
FIG. 5 is another cross-sectional perspective view, similar to FIG. 4, showing an embodiment of an air chamber communicating with the interior of the second inflatable module, portions of the cylindrical sidewalls of the cylindrical core assembly being omitted for clarity of illustration.
Figure 6:
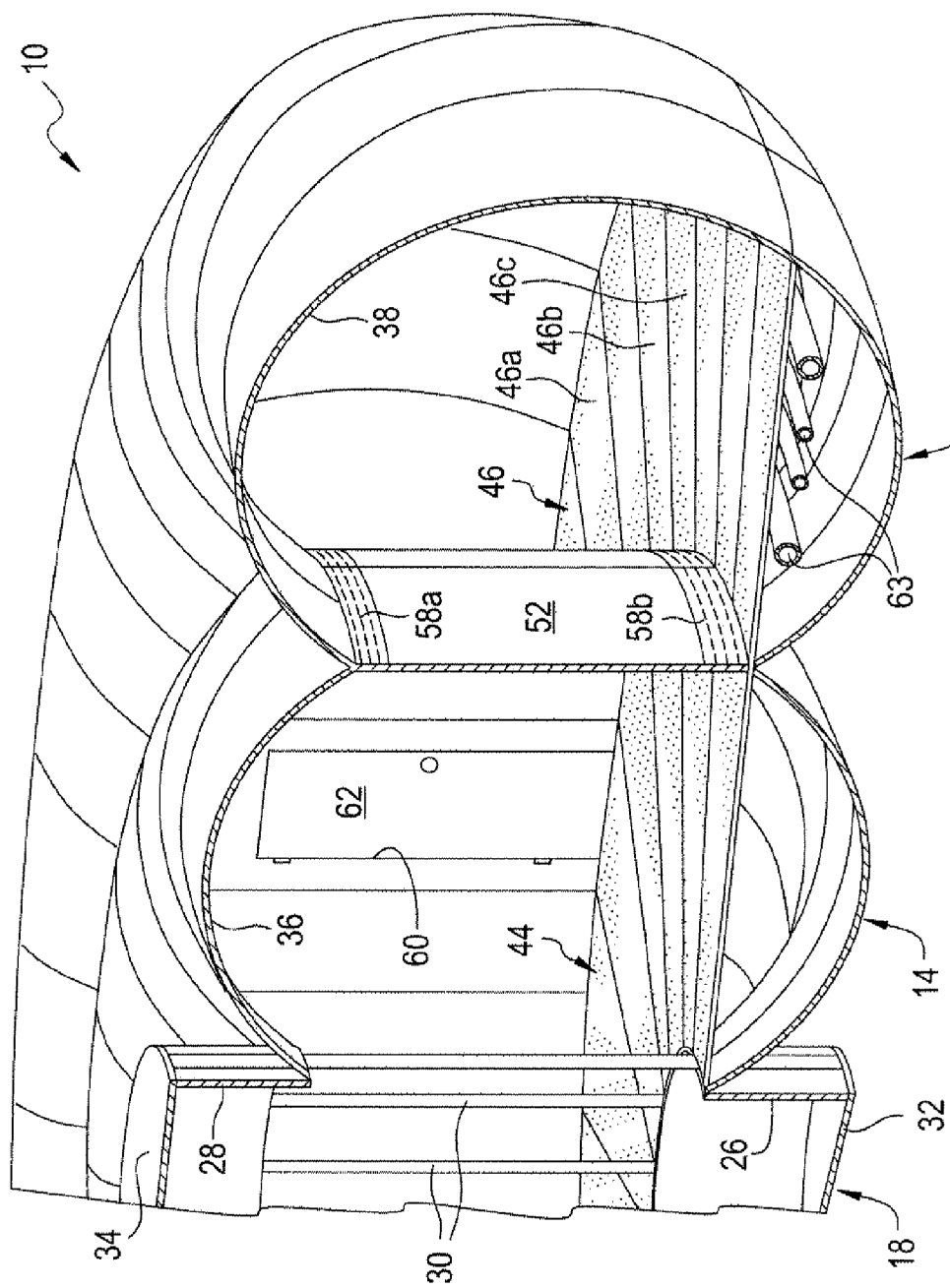
FIG. 6 is another cross-sectional perspective view of an embodiment of the inflatable structure of FIGS. 1-4.

Referring now to FIGS. 5 and 6, the flooring 44, 46 extends laterally across the lower interior volumes of inner and outer modules 14, 16, respectively. As shown in FIG. 6, the flooring 46 may comprise in one embodiment a series of radially extending segments or gores (partially shown as 46a, 46b, 46c) that are stitched together. Flooring 44, 46 may also be formed of reinforced flexible sheeting, e.g., reinforced composite sheeting. Flooring 44 is connected to the lower sleeve member 26 of the core assembly 18 and extends radially outward therefrom to a common sidewall 52. Flooring 46, in one embodiment, is co-planar with the flooring 44 and extends radially outward from common sidewall 52 to an outer sidewall portion 56 of the second, outer module 16.

The inner and outer modules 14, 16 are operatively connected together structurally along common sidewall 52 by a connecting means, which as shown in FIG. 6 comprises a combination of upper stitching 58a and lower stitching 58b. Upper stitching 58a is sewn through overlapping portions of the wall structures 36 and 38 and through an upper edge portion of common sidewall 52. Similarly, lower stitching 58b is sewn through a lower edge portion of common sidewall 52 and through adjacent, overlapping portions of wall structures 36, 38. Accordingly, the wall structures 36 and 38 and the common sidewall 52 are all operatively connected in one embodiment by stitching. In an alternate embodiment (not shown), the wall structures 36, 38 may each extend circumferentially around the minor diameters of modules 14, 16, respectively, in which case the common sidewall 52 may be omitted. In this alternate embodiment, mutually adjacent portions of wall structures 36, 38 are stitched or otherwise fastened together. In yet another alternate embodiment, the outer circumference of the first (inner) module 14 and the inner circumference of the second (outer) module 16 may be spaced apart from one another and interconnected by a combination of airlocks, ports, and/or other means for providing access or passage between the interior volumes of each module.

As shown in FIGS. 4-6, the inflatable structure 10 further comprises at least one port or structural pass-through 60 formed within common wall 52. The at least one port 60 interconnects the modules 14 and 16 and provides access or passage between the interior volume of the first module 14 and the second module 16 such that, during deployment and inflation of the structure 10, air or other gas under pressure introduced into initially one of the modules (such as the first or inner module 14) also flows into the other module, (such as the outer module 16). Accordingly, either module 14 or 16 may be inflated simultaneously from a single source, such as a tank or tanks of compressed air or other gasses (not shown) positioned within the core assembly 18. After deployment and inflation, the at least one port 60 also serves to equalize pressure levels within the two modules and to permit crew members and/or other occupants to pass conveniently among the modules 14, 16. In one embodiment, a door assembly or hatch 62 is fitted within the port 60. The hatch 62 includes seals and locking mechanisms (not shown) that permit the hatch to be hermetically sealed by an occupant if it becomes necessary to isolate the interior volume of the inner module 14 from that of the outer module 16. Such a procedure may be necessary during maintenance or conditioning work on at least one of the modules or in the event of an emergency in which one of the modules were compromised. An example of another embodiment of a port or structural pass-through is described in detail in U.S. patent application. Ser. No. 11/610, 295, filed Dec. 13, 2006, entitled "Apparatus for Integrating a Rigid Structure into a Flexible Wall of an Inflatable Structure", now U.S. Pat. No. 7,509,774, the entire contents therein being incorporated herein by reference.

Conduits, power cables, and the like, represented collectively as element 63, may be suitably located in the space or compartment formed beneath flooring 46 or alternatively flooring 44. In another embodiment, one or more partitions or bulkheads (not shown) may be positioned to extend radially from the central core of the inflatable structure within the interiors of each module (14 or 16) so as to divide each module into multiple sections or rooms as desired for a particular application.

As shown in FIG. 5, in one embodiment the inflatable structure 10 further comprises an airlock 66 that is operatively connected to the outer module 16. The airlock 66 includes an outer port 68 having a hatch or door 70 that can be hermetically sealed along with an inner hatch and doorway (partially shown) that enables access to the interior volume of module 16. The airlock, when it further comprises a suitable pressurization chamber, permits the ingress into and egress from the inflatable structure 10 by astronauts or other occupants by maintaining the interior at a relatively constant, desired pressure. Such an airlock 66 may be used in one embodiment when the inflatable structure 10 is intended to be a habitat in an exoatmospheric environment under vacuum or near vacuum conditions or in the presence of hazardous gasses. Further, in applications where the inflatable structure lies upon a surface 12 such as that shown in FIG. 1, the airlock 66 further comprises downwardly extending supports 76, such as the fan-shaped structure of FIG. 5, for stability and support of the airlock.

Figure 7A:
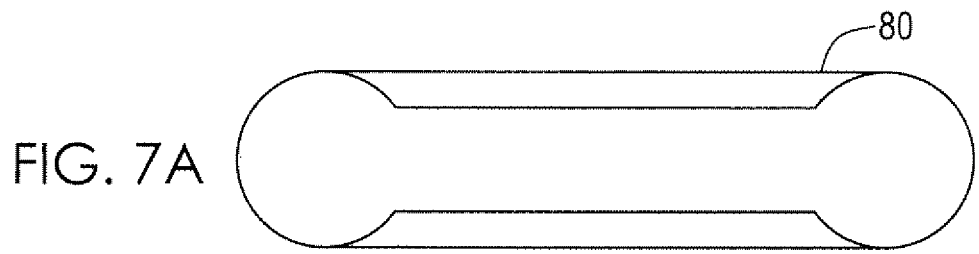
FIGS. 7A through 7E illustrate a representative sequence of stages of an initial construction of an inflatable nested toroid structure in accordance with one embodiment.

A series of cross-sectional views appearing in FIGS. 7A-7E illustrates successive stages of preliminary assembly of the inflatable structure 10 before deployment in accordance with one embodiment, wherein the inner toroidal module 14 and the outer toroidal module 16 are shown constructed with a rigid core assembly 18. Beginning with FIG. 7A, a first restraint layer 80 of generally toroidal configuration is provided for outer module 16. The function of a restraint layer is to sustain the tensional forces exerted on the outer flexible wall structures of a particular module by the increasing positive pressure within such module upon its inflation. The flexible outer wall or shell of an inflatable module comprises the restraint layer 80 and several other layers of material, several of which are omitted from the appended drawings for simplicity of illustration. The restraint layer 80 is made of a high-tensile strength material such as Kevlar® or Vectran®. The restraint layer 80 is represented in FIG. 7A as it would appear once in a fully inflated, deployed mode.

Figure 7B:
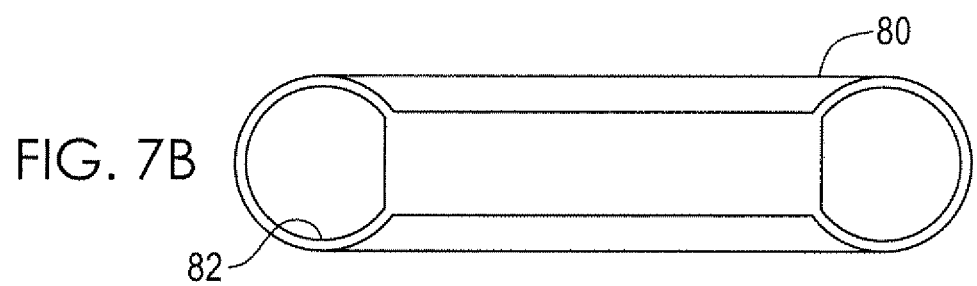

The restraint layer 80 physically constrains the module 16 and prevents it from expanding outwardly beyond its designed size and configuration. It also serves to protect bladder 82 from the surrounding environment once deployed, and it prevents outward deformation of bladder 82 during initial assembly. For instance, as shown in FIG. 7B for the second step of assembly, bladder 82 is inserted within outer restraint layer 80 to its predetermined size and toroidal configuration. The bladder 82 is formed of gas-impervious rubberized material. During this step of assembly, the bladder is attached to the restraint layer at certain indexing locations. Additionally, the bladder is sealed to any ports that are integrated into the restraint layer such as port 60.

Figure 7C:
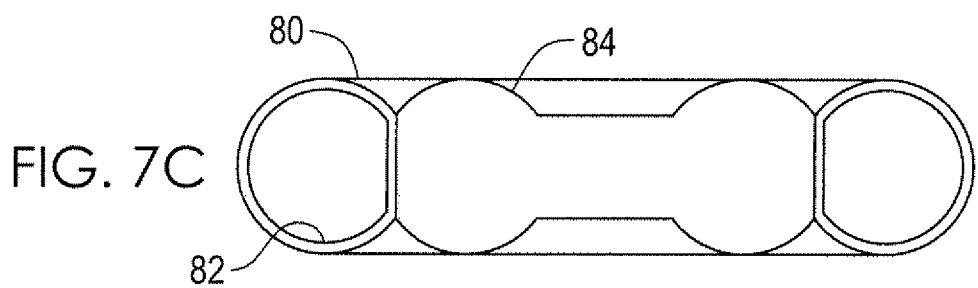

For the third step of assembly shown in FIG. 7C, a second restraint layer 84, also of generally toroidal configuration, is provided for construction of the inner module 14. The second restraint layer 84 is nested within and adjacent to the inner circumference of outer restraint layer 80 and is typically coaxially centered within and alongside the first restraint layer 80. Restraint layer 84 may comprise material of similar structure as that used for restraint layer 80.

Figure 7D:
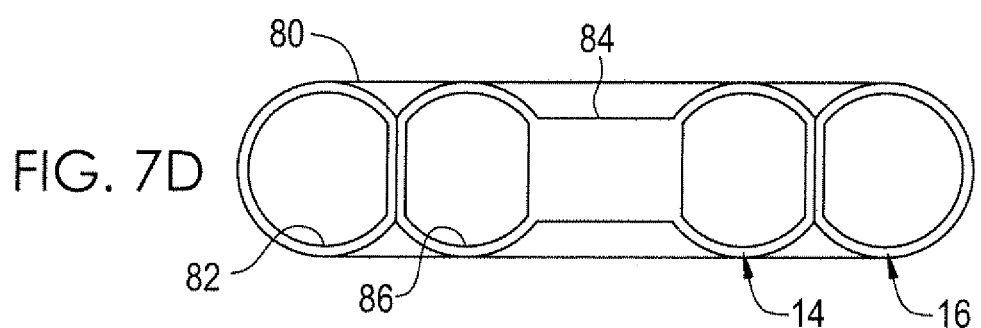

As seen in FIG. 7D, the fourth step of assembly comprises the insertion of a second bladder 86 within the toroidal cross-sectional area of the second restraint layer 84. The second bladder 86 is formed of a generally toroidal configuration and may also be formed of a gas-impervious rubberized material. During this fourth step of assembly, the second bladder 86 is attached to the second restraint layer 84 at certain indexing locations and is sealed to any ports that are integrated into the second restraint layer, such as port 60.

Figure 7E:
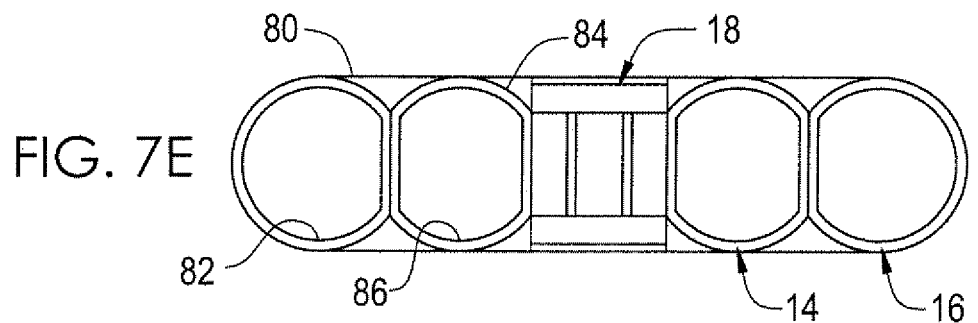

As shown in FIG. 7E, the fifth step of assembly comprises the placement and attachment of a core assembly 18. Core assembly 18 is positioned coaxially within and alongside the second restraint layer 84 and second bladder 86.

Figure 8:
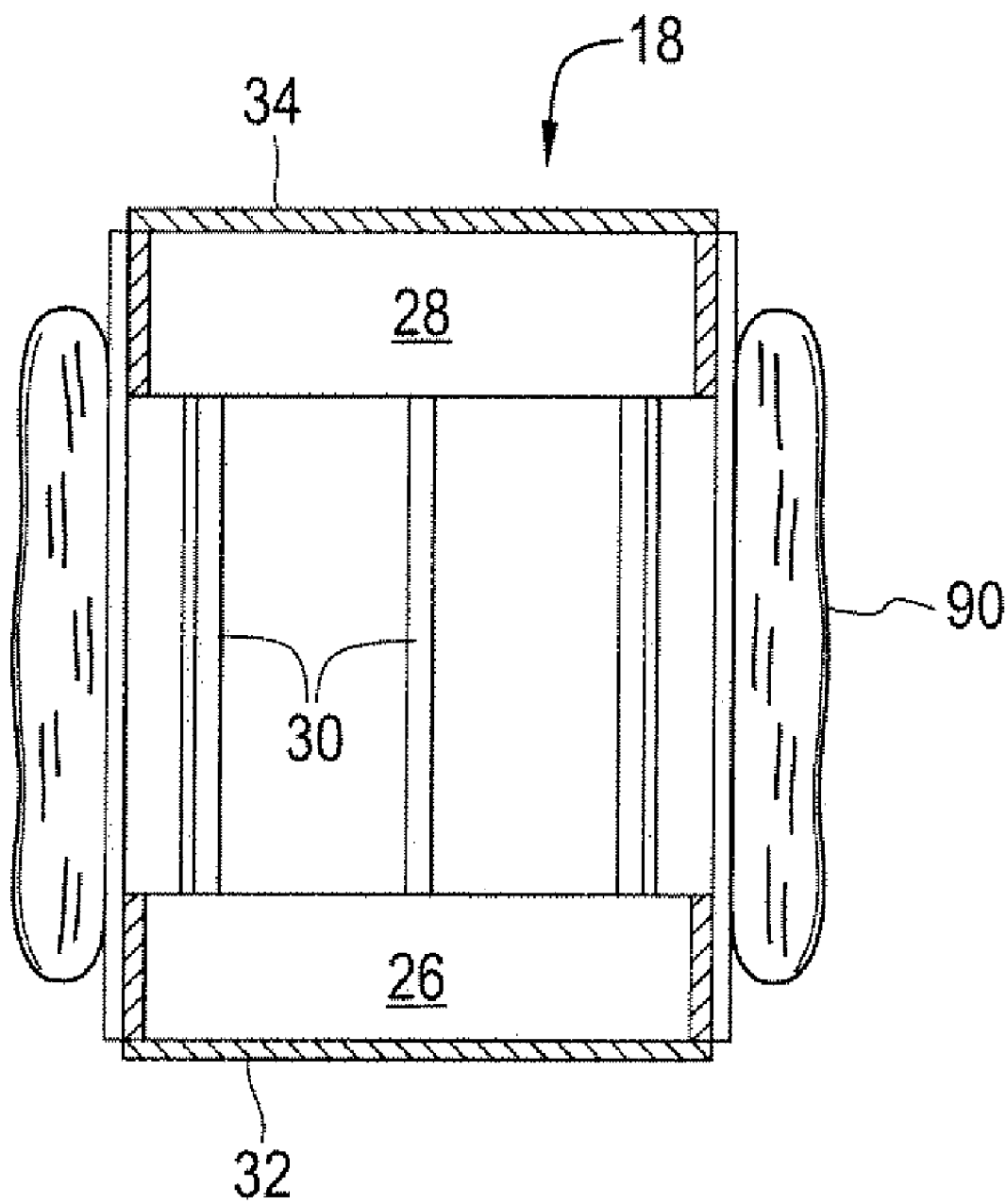
FIG. 8 is a cross-sectional, partially diagrammatic representation of the inflatable structure in a non-deployed, non-inflated mode.

FIG. 8 shows a partial cross-sectional view of an embodiment of the inflatable structure 10 having a rigid core 18 in its deflated, non-deployed mode, after having been pre-assembled, for transport and delivery to a desired site. In the deflated, non-deployed mode, the flexible outer walls 36, 38 (FIGS. 4 and 6) are folded together and extended circumferentially around the core structure 18, forming a folded bundle 90 extending around the exterior side portion of core structure 18. The folded bundle 90 extends circumferentially around sleeve members 26, 28 and interconnecting struts 30. The interior volumes of modules 14, 16 are connected, through a valve mechanism or other means for conveying air, to an inflation/deflation means, such as at least one tank (not shown) containing air or other gasses under pressure, for inflating the modules, or containing a vacuum for situations when the modules are to be deflated. The outer dimensions of the core structure 18 and the encircling bundle 90 are necessarily less than the corresponding inner dimensions of the vehicle in which the inflatable structure is to be ultimately transported to a desired site, e.g., the cargo bay of a launch vehicle, and the diameter of the inflatable structure 10 in its non-deployed mode as seen in FIG. 8 is substantially less than that of the deployed structure viewed in FIGS. 1-6. Although the inflatable structure has been described as forming a single, compact assembly when in its deflated, non-deployed mode, in other embodiments, it may be further supplemented or expanded with additional elements, such as additional toroidal modules, during or after its deployment. Thus, in some applications, as may be the case with large, more extensive habitats or the like, more than one launch sequence may be used to deliver and deploy the inflatable structure.

Another embodiment for pre-assembly of the inflatable structure 10 is illustrated with reference to the series of drawings given by FIGS. 9-14. For convenience of description in the following description of this embodiment, bladder 86 will be termed the "inner bladder;" bladder 82 will be termed the "outer bladder;" restraint layer 84 will be termed the "inner restraint layer;" and restraint layer 80 will be termed the "outer restraint layer". This embodiment primarily differs from the previous assembly described for FIGS. 7A-7E in that, for this assembly, the outer restraint layer 80 comprises two halves or segments 80A and 80B that are attached to one another and to inner restraint layer 84.

Figure 9:
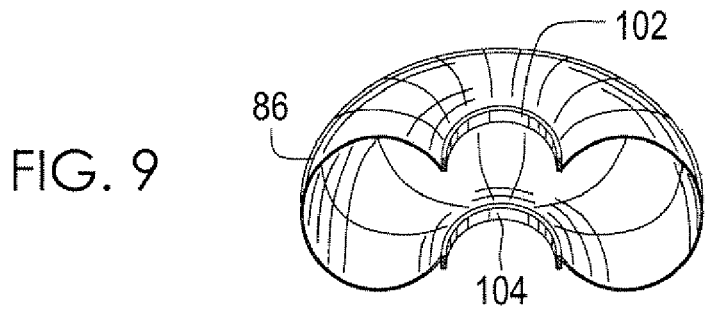
FIG. 9 is a diagrammatic, cross-sectional perspective representation of the bladder of the inner toroidal module in its deployed mode showing annular interface rings.
Figure 14:
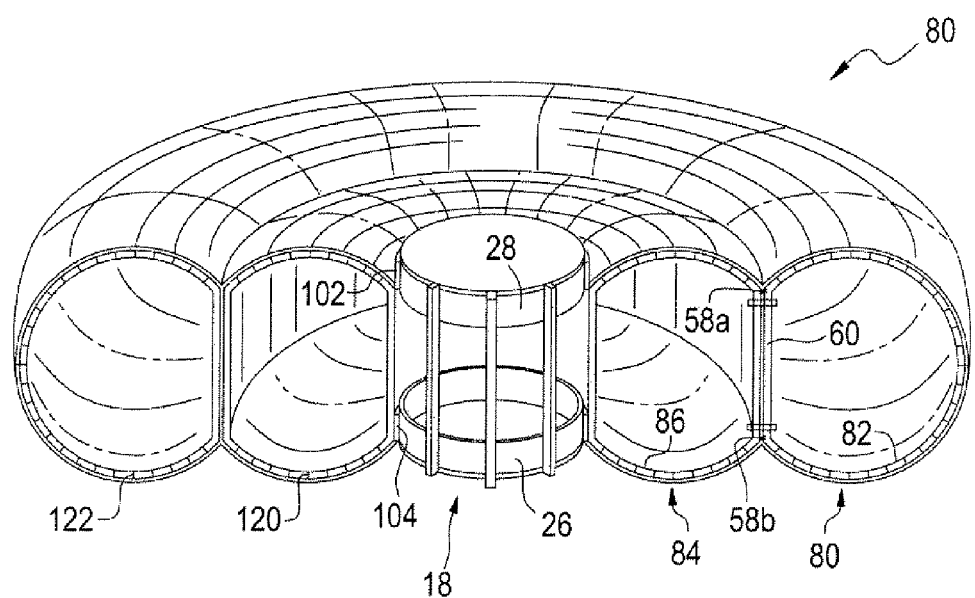
FIG. 14 is a perspective representation similar to FIG. 13 illustrating other components of the inflatable structure operatively connected with core assembly.

Referring now to FIG. 9, inner bladder 86 is shown diagrammatically as configured when the inflatable structure 10 is in the deployed or inflated mode, the inner restraint layer 84 (of FIG. 11) and other associated components being omitted in this view for clarity in illustration. The upper and lower inner, circular edge portions of the bladder 86 are sealingly connected to first and second (upper and lower as viewed in the FIG. 9) interface rings 102, 104. The rings 102, 104 may comprise a rectangular cross-section and have an inner diameter slightly larger than the outer diameter of the upper and lower annular, sleeve-shaped members 28, 26 (respectively) of the core assembly 18 (FIGS. 4-6) to permit the rings 102 and 104 to be fitted circumferentially around and operatively connected to its respective sleeve-shaped members during the final stages of pre-assembly, as shown in FIG. 14. The circular inner edge portions of the upper and lower portions of the inner bladder 86 are sealingly connected to the respective upper and lower interface rings 102, 104, by bonding, O-rings, or other sealing methods, such as the manner shown and described in U.S. Pat. Nos. 6,231,010 and 6,547,189, and incorporated herein by reference.

Figure 10:
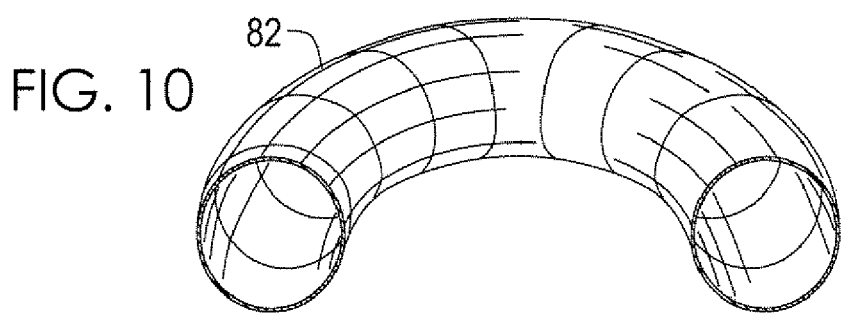
FIG. 10 is diagrammatic representation, similar to FIG. 9, of the bladder of the outer toroidal module when deployed.

Referring now to FIG. 10, outer bladder 82 appears (in partial view) as configured when module 16 of inflatable structure 10 (FIGS. 1-6) is in the deployed, inflated mode, with associated components being omitted for clarity in illustration. Because the inner module 14 nests concentrically within the outer module 16, the inside diameter of outer bladder 82 is substantially equivalent to the outside diameter of the inner bladder 86 (FIG. 9) and the inner restraint layer 84 (FIG. 11).

Figure 11:
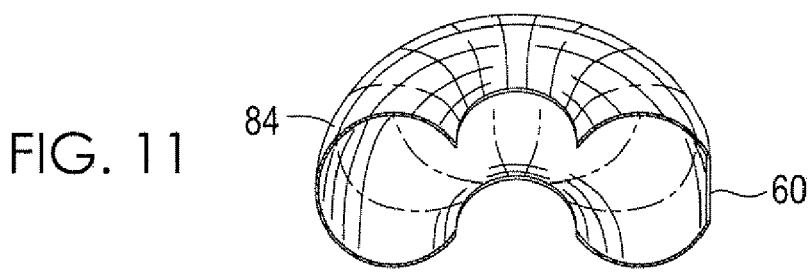
FIG. 11 is a diagrammatic representation of the restraint layer of the inner toroidal module when deployed.

Referring now to FIG. 11, inner restraint layer 84 is of a toroidal configuration similar in size to that of inner bladder 86 (FIG. 9). Port 60, shown in FIGS. 4-6 and 14, is formed through the outer sidewall portion of inner restraint layer 84 and inner bladder 86. As with FIGS. 9 and 10, the diagrammatic representation of restraint layer 84 in FIG. 11 is shown in an expanded, deployed configuration, with associated components omitted for clarity of illustration. The upper and lower central openings of the inner restraint layer 84 and the inner bladder 86 (located near interface rings 102 and 104) are positioned in association with each other.

Figure 12:
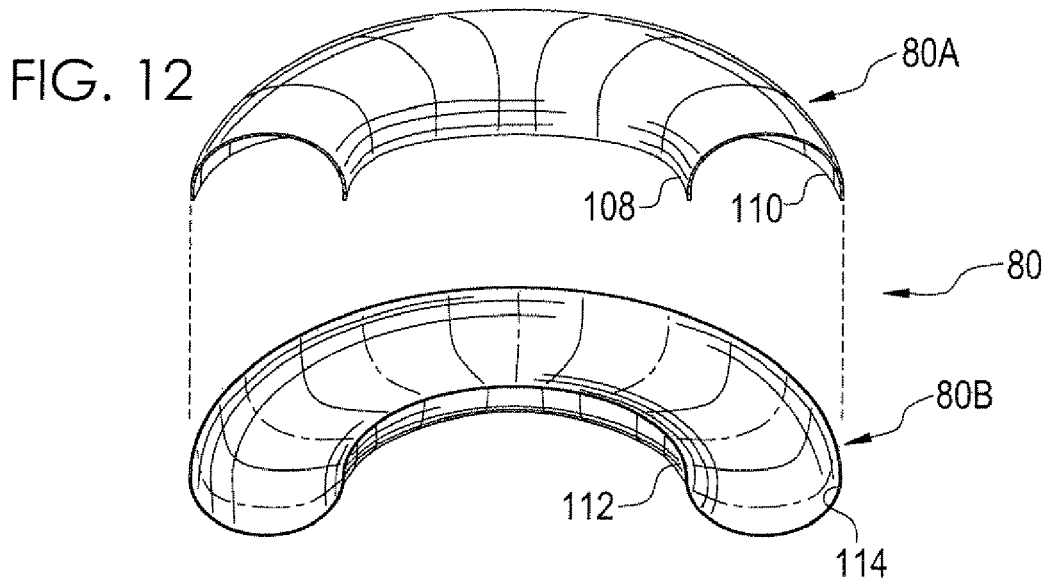
FIG. 12 is a diagrammatic, exploded view of one embodiment of the restraint layer for the outer toroidal module showing upper and lower segments.

As shown in FIG. 12, outer restraint layer 80 in this embodiment is initially formed of two halves—first and second mating segments 80A and 80B (upper and lower segments appear in FIG. 12)—for facilitating assembly. For clarity of illustration in FIG. 12, the segments 80A and 80B are diagrammatically represented in an exploded view as they would be configured in a full deployment with associated components omitted. The first and second segments 80A and 80B are ultimately connected together to form a toroidal configuration, the first segment 80A comprising inner and outer, circumferentially extending wall portions 108 and 110 that project down toward the second segment 80B. Similarly, the second segment 80B includes inner and outer circumferential wall portions 112 and 114 that project up toward the first segment 80A. When connected together and deployed, as seen in FIG. 14, the first and second segments 80A and 80B (FIG. 12) form the toroidal configuration for module 16 (FIGS. 1-6).

As shown in FIGS. 11 and 12, the restraint layers 80, 84 may comprise segments or gores of a flexible, high-tensile strength fabric material such as Kevlar® or Vectran®. In other embodiments, restraint layers 80, 84 may comprise a webbing of straps, woven together, of high tensile strength, as shown and described in the '010 and '189 patents.

Figure 13:
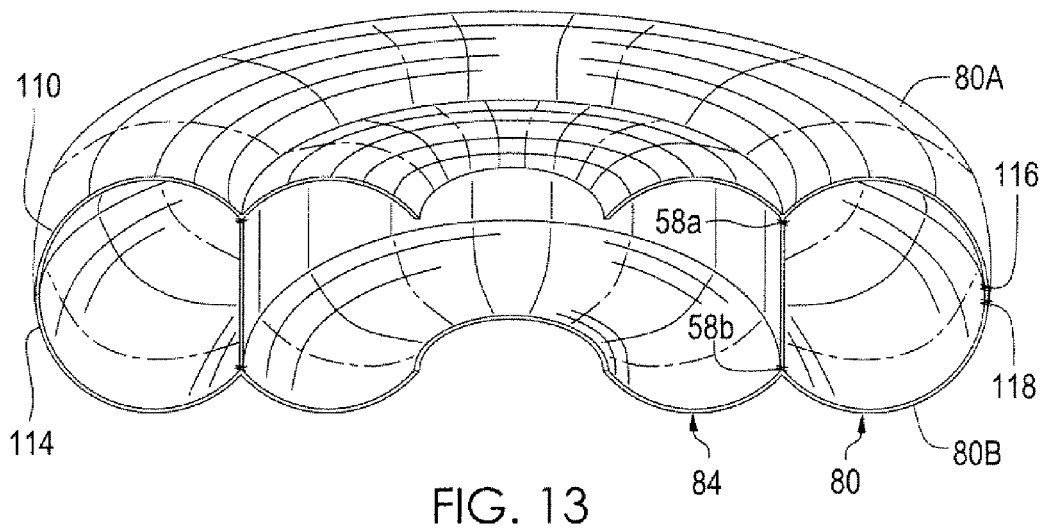
FIG. 13 is a perspective representation of one embodiment of the restraint layers of the inner and outer toroidal modules of the inflatable structure.

With reference to FIGS. 13 and 14, assembly of the embodiment begins with the inner restraint layer 84 being positioned circumferentially within and connected in a concentric fashion to the two halves of outer restraint layer 80. The inner portions of first and second segments 80A and 80B are connected to each other and to inner restraint layer 84 by stitching 58A and 58B that extends through circumferential wall portions 108 and 112 (FIG. 12).

As shown in FIG. 14, inner bladder 86 is installed within the inner restraint layer 84 and retained or indexed in place by index ties 120. Similarly, outer bladder 82 is installed within outer restraint layer 80 and retained by index ties 122. The sequence of bladder insertion during assembly may vary for this embodiment. For instance, the outer bladder 82 may be inserted into the interior volume of the outer restraint layer first, followed by the insertion of the inner bladder 86 into the interior volume of the inner restraint layer, or the sequence may be vice versa. However, only after the outer bladder 82 is installed and indexed should circumferential wall portions 110, 114 be interconnected by stitching 116, 118 (FIG. 13) to enclose the interior volume of outer restraint layer 80.

The structural pass-through or port 60 (FIG. 14) is formed by aligning the structural pass-through of the interior circumferential wall portions 108, 112 with the structural pass-through of the common sidewall of inner restraint layer 84 and inner bladder 86. This step of the assembly process may require inflation of the interior volume of each bladder to enable entry of such interior and alignment of the port.

Thereafter, and with continued primary reference to FIG. 14, the resulting assembled structure is placed over the inner core assembly 18. The core assembly 18 extends coaxially through the upper and lower central openings defined by the inner diameters (the center) of inner restraint layer 84 and inner bladder 86. The upper and lower interface rings 102 and 104 (FIG. 9) are positioned at its respective upper and lower annular sleeve portions 28, 26. The interface rings 102 and 104 are then operatively connected, by welding, bolting, etc., to the adjacent upper and lower annular sleeve portions 28, 26, respectively, thereby affixing the inner bladder 86 to the core assembly 18. The inner restraint layer 84 also extends circumferentially around the periphery of the upper and lower sleeve portions 28, 26 of inner core assembly 18 and is affixed thereto by means of connecting mechanisms as shown and described in the '010 and '189 patents.

Figure 15:
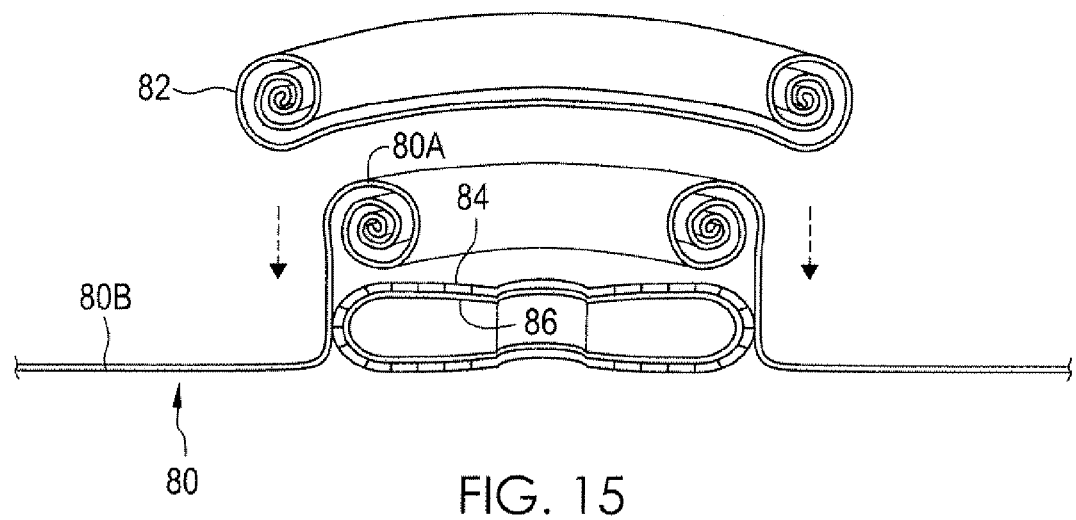
FIG. 15 is a diagrammatic representation of an embodiment for installing the bladder of the outer toroidal module within the outer restraint layer.
Figure 16:
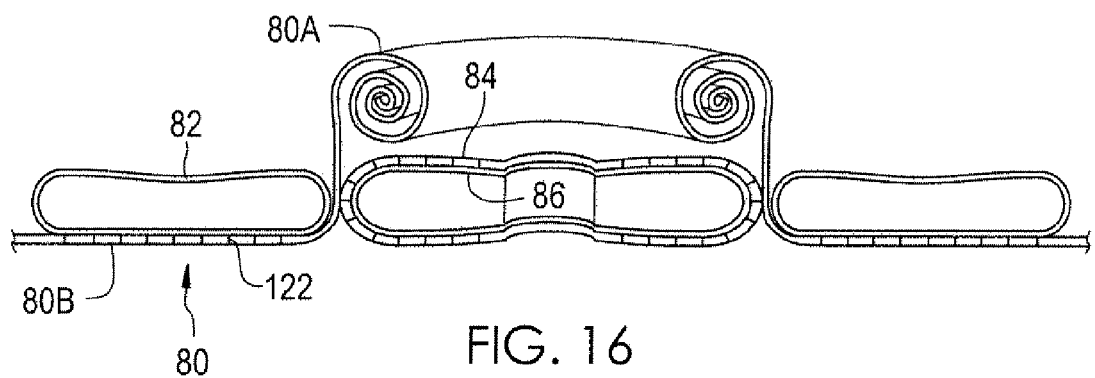
FIG. 16 is a view similar to FIG. 15 illustrating a subsequent stage of assembly for this embodiment.
Figure 17:
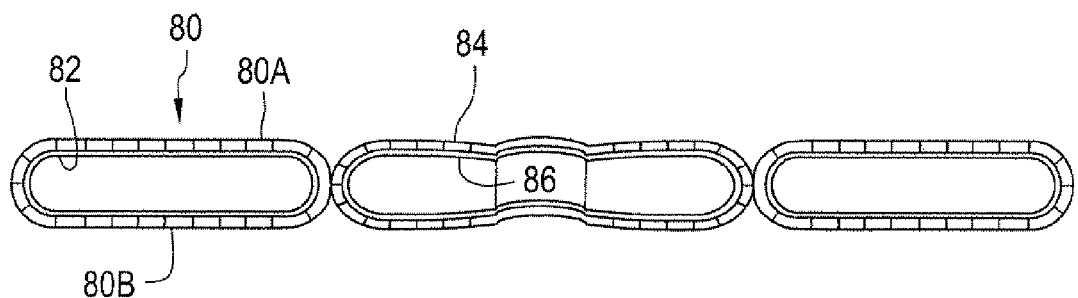
FIG. 17 is a view similar to FIGS. 15 and 16 illustrating another stage of assembly.

FIGS. 15-17 represent yet another embodiment for pre-assembly (before transport and deployment) of the inflatable structure 10. As seen in FIG. 15, after inserting the inner bladder 86 within the interior of inner restraint layer 84, the outer bladder 82, in a generally circular, planar configuration, is placed over the inner restraint layer 84 and inner bladder 86. For this embodiment, the outer periphery of the upper segment 80A of the outer restraint layer 80 is rolled up and away from the bottom segment 80B and may be placed over the outer edge portions of the inner restraint layer 84. Conversely, the outer bladder 82 is rolled up such that its innermost peripheral portion is positioned near the inner perimeter of the restraint layer 80.

Referring primarily now to FIG. 16, the outer bladder 82, is lowered onto the lower segment 80B of the outer restraint layer 80 and then unrolled outward such that the bottom surface of the bladder 82 spreads over the upper surface of lower segment 80B. Bladder 82 is then affixed and indexed to the lower segment 80B, such as by the index ties 122.

The upper restraint layer segment 80A is next unrolled over the upper surface of the outer bladder 82, as seen in FIG. 17, and similarly affixed and indexed by index ties 122. The outer peripheral edge portions of the upper and lower restraint layer segments 80A and 80B are then fastened together, such as by stitching 116, 118 (or other fastening means) previously described and shown in FIG. 14, to enclose the outer bladder 82 and protect its exterior from the surrounding environment.

During pre-assembly of the inflatable structure 10, partial or full inflation of the inner and outer modules 14, 16 enables a worker to enter the modules and complete close out work on the structural pass-through 60 and any other systems. Once full inflation and deployment of the structure of FIG. 17 occurs, the outer restraint layer 80, outer bladder 82, the inner bladder 86 and the inner restraint layer 84 all expand to form the toroidal configuration previously seen in and described with respect to FIGS. 1-6. Once pre-assembled for transport and delivery, the various embodiments of the inflatable structure 10 may be moved to a location for deployment as a habitat, laboratory, storage facility, or the like.

By having at least two, circumferentially nested, generally toroidal modules, the inflatable structure 10 provides larger interior volume and capacity for construction of multiple interior compartments with lesser circumferential forces exerted upon the wall structure than a single inflatable cylindrical module having an outer diameter of similar dimension as the overall diameter of the nested construction. Lesser circumferential forces are exerted on the walls of the nested structure because such circumferential forces are a function of the minor diameter of each toroid for the nested toroidal module, whereas for a single cylindrically shaped module, such circumferential forces are proportional to the major diameter of a cylindrically-shaped module. Thus, for a nested structure having an overall diameter of a given value, the minor diameter of the toroid module should be a lower value (because at least two such toroidal modules are used) than the value of the major diameter of the single cylindrical module having a correspondingly similar overall dimension. Accordingly, the use of two or more circumferentially nested toroidal modules achieves efficiencies of scale and deployment.

With respect to space applications in particular, because the inflatable structure may be transported to a particular location in a deflated, collapsed mode that is relatively compact and later deployed (by inflation) at a desired location to provide a self-supporting structure of substantial size, it permits the convenient transport and deployment of space modules of size and interior volume that are substantially greater than that of conventional, rigid space modules or compartments having equivalent initial mass and size. Because available space launch vehicles have limits to cargo size and lift capacity, embodiments of the inflatable structure 10 may have its non-deployed, deflated mode designed so as to fit conveniently within the cargo bay of current or future proposed launch vehicles. Further, while the embodiments disclosed herein may require some human activity during the deployment of the inflatable structure in exoatmospheric space, such human activity should entail substantially less effort and time for construction and assembly as compared to a conventional, rigid space structure or module of comparable size because assembly of the structure primarily concerns simple inflation of the module at the desired location or trajectory to form a self-supporting structure. Thus, in such difficult environmental conditions as are experienced in exoatmospheric space, multiple modules that are simply and expeditiously deployed provide a significant advantage. Further, when used as a human habitat in locations having a gravitational force, the inflatable structure may provide convenient and interconnected living areas in which its occupants are not required to traverse multiple, interconnected modules connected by narrow pathways nor to move up and down among different vertical levels but rather horizontally about a one-story environment.

The inflatable structure 10 may also be used for applications requiring transport and assembly of a relatively large, self-supporting structure at a remote or environmentally difficult region for its ultimate deployment and use because the structure is configured to be conveniently pre-assembled and loaded in a vehicle for transport to a desired site in its compact, deflated mode and later deployed efficiently and quickly at the desired site. Thus, in addition to space-related applications, the inflatable structure 10 may be used in remote terrestrial regions having harsh or adverse climactic conditions that disfavor lengthy construction times. Because deployment may be accomplished simply and quickly, workers who assemble the inflatable structure are not exposed for extensive periods to adverse weather conditions during the deployment.

While only a few exemplary embodiments of this invention have been described in detail above, those skilled in the art will readily appreciate that many modifications are possible in the exemplary embodiments without materially departing from the novel teachings and advantages of this invention. For example, although some of the embodiments have generally been described in relation to applications such as those in exoatmospheric space, the invention also has other applications, such as in structures intended for use in polar, marine, and various other terrestrial environments on Earth. Accordingly, the scope of the present invention should be considered in terms of the following claims, and it is not to be limited only to the details of the embodiments and operation described in this specification and shown in the drawings.

Accordingly, all such modifications to the described embodiments contained herein are intended to be included within the scope of this invention as defined in the following claims. In the claims, means-plus-function and step-plus-function clauses are intended to cover the structures or acts described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures.

What is claimed is:

1. An inflatable structure adapted for deployment in exoatmospheric space, comprising, upon deployment:
    at least two substantially toroidal, inflatable modules, comprising first and second, substantially toroidal, inflatable modules each having a minor diameter;
    the second module having a major diameter greater than that of the first module;
    the first module and the second module being positioned to one another in a substantially co-planar relationship, the first module being nested circumferentially alongside the second module;
    means for operatively connecting the first module and the second module structurally together;
    a structural pass-through for providing access between the interiors of the first and second modules, the structural pass-through being configured to allow a human occupant to pass conveniently between the interior volume of the first module and the interior volume of the second module; and
    means for shielding the inflatable structure from at least one environmental hazard.

2. The inflatable structure of claim 1, further comprising a core assembly, the first module circumferentially surrounding the core assembly.

3. The inflatable structure of claim 1, further comprising means for inflating the first module and the second module.

4. The inflatable structure of claim 1, wherein the minor diameter of the first module is substantially equal to the minor diameter of the second module.

5. The inflatable structure of claim 1, further comprising at least one additional inflatable toroidal module having, in its deployed mode, a major diameter greater than that of the second module, the second module being nested concentrically within and circumferentially alongside the at least one additional toroidal module.

6. The inflatable structure of claim 1, wherein the means for shielding the inflatable structure from at least one environmental hazard comprises a layer of protective material extending over at least portions of the first and second modules.

7. An inflatable structure adapted for deployment in exoatmospheric space, comprising, upon deployment:
    at least two substantially toroidal, inflatable modules, comprising first and second, substantially toroidal, inflatable modules each having a minor diameter;
    the second module having a major diameter greater than that of the first module;
    the first module and the second module being positioned to one another in a substantially co-planar relationship, the first module being nested circumferentially alongside the second module;
    means for operatively connecting the first module and the second module structurally together; and
    a structural pass-through for providing access between the interiors of the first and second modules, the structural pass-through being configured to allow a human occupant to pass conveniently between the interior volume of the first module and the interior volume of the second module.

8. The inflatable structure of claim 7, further comprising a core assembly, the first module circumferentially surrounding the core assembly.

9. The inflatable structure of claim 7, further comprising means for inflating the first module and the second module.

10. The inflatable structure of claim 7, wherein the minor diameter of the first module is substantially equal to the minor diameter of the second module.

11. The inflatable structure of claim 7, further comprising means for shielding the inflatable structure from at least one environmental hazard in exoatmospheric space.

12. The inflatable structure of claim 7, further comprising at least one additional inflatable toroidal module having, in its deployed mode, a major diameter greater than that of the second module, the second module being nested concentrically within and circumferentially alongside the at least one additional toroidal module.

13. The inflatable structure of claim 11, wherein the means for shielding the inflatable structure from at least one environmental hazard comprises a layer of protective material extending over at least portions of the first and second modules.

* * * * *